United States Patent
Stavely et al.

(10) Patent No.: US 7,272,305 B2
(45) Date of Patent: Sep. 18, 2007

(54) PHOTOGRAPHY SYSTEM THAT DETECTS THE POSITION OF A REMOTE CONTROL AND FRAMES PHOTOGRAPHS ACCORDINGLY

(75) Inventors: Donald J. Stavely, Windsor, CO (US); Andrew C. Goris, Loveland, CO (US); Linda A. Kennedy, Fort Collins, CO (US); Victoria L. Naffier, Fort Collins, CO (US); Robert F. Yockey, Fort Collins, CO (US); Lisa K Roberts, Fort Collins, CO (US); George Prokop, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 10/658,073

(22) Filed: Sep. 8, 2003

(65) Prior Publication Data

US 2005/0052539 A1    Mar. 10, 2005

(51) Int. Cl.
*G03B 17/00* (2006.01)
*H04N 5/232* (2006.01)

(52) U.S. Cl. .................. 396/58; 348/211.99; 348/211.2

(58) Field of Classification Search ................ 396/56, 396/58, 59; 348/211.99, 211.2, 211.4, 169
See application file for complete search history.

(56) References Cited

U.S. PATENT DOCUMENTS

| | | | |
|---|---|---|---|
| 4,937,604 A | 6/1990 | Yoshida et al. | |
| 5,012,335 A * | 4/1991 | Cohodar | 348/158 |
| 5,223,875 A * | 6/1993 | Yanagisawa | 396/58 |
| 5,235,376 A | 8/1993 | Inoue et al. | |
| 5,247,327 A | 9/1993 | Suzuka et al. | |
| 5,359,363 A | 10/1994 | Kuban et al. | |
| 5,517,276 A | 5/1996 | Higaki et al. | |
| 5,610,653 A | 3/1997 | Abecassis | |
| 6,466,742 B1 | 10/2002 | Baron | |
| 2003/0169339 A1* | 9/2003 | Allen et al. | 348/169 |
| 2005/0041112 A1* | 2/2005 | Stavely et al. | 348/208.14 |

* cited by examiner

*Primary Examiner*—W. B. Perkey
*Assistant Examiner*—Rishi Suthar
(74) *Attorney, Agent, or Firm*—David W. Boyd

(57) ABSTRACT

A photography system includes a digital camera and a remote control whose location can be detected by the camera. The remote control includes a control for causing the camera to take a photograph. The camera selects a region to photograph from its field of view, based on the location of the remote control. The selected region may include the entire field of view of the camera or a portion thereof. The camera may optionally select a region that places the remote control in the center of the region. The photographer may optionally specify the size of the region to be selected. The camera may optionally adjust the size of the selected region to assist in photographic composition. The camera may optionally be capable of making video recordings.

21 Claims, 7 Drawing Sheets

PHOTOGRAPHY SYSTEM THAT DETECTS THE POSITION OF A REMOTE CONTROL AND FRAMES PHOTOGRAPHS ACCORDINGLY

FIELD OF THE INVENTION

The present invention relates generally to photography.

BACKGROUND OF THE INVENTION

A common inconvenience in consumer photography is that the photographer cannot easily be included in the scene being photographed. Some cameras provide a "self-timer" that allows the photographer to compose a photograph, activate the timer, and place herself in the scene in time to be included in a photograph taken by the camera upon expiration of the timer. However, this solution requires considerable preparation and lacks spontaneity.

Other cameras include a remote control device that can activate the camera from a distance. The photographer can position the camera, place herself in the scene, and use the remote control to take photographs whenever she desires. However, this method generally gives the photographer little control over the composition of the photograph once the camera is positioned, and does not adapt well to changing scenes.

The inconvenience is particularly acute in video photography. The videographer must typically choose between letting the camera run unattended during an activity, resulting in an unartful recording, or removing himself from the activity for the duration of the recording to tend to the camera.

What is needed is a system and method for conveniently and artfully photographing or video recording a scene that includes the photographer.

SUMMARY OF THE INVENTION

A photography system includes a digital camera and a remote control whose location can be detected by the camera. The remote control includes a control for causing the camera to take a photograph. The camera selects a region to photograph from its field of view, based on the location of the remote control. The selected region may include the entire field of view of the camera or a portion thereof. The camera may optionally select a region that places the remote control in the center of the region. The photographer may optionally specify the size of the region to be selected. The camera may optionally adjust the size of the selected region to assist in photographic composition. The camera may optionally be capable of making video recordings.

DETAILED DESCRIPTION OF THE PREFERRED EMBODIMENT

Figure 1:
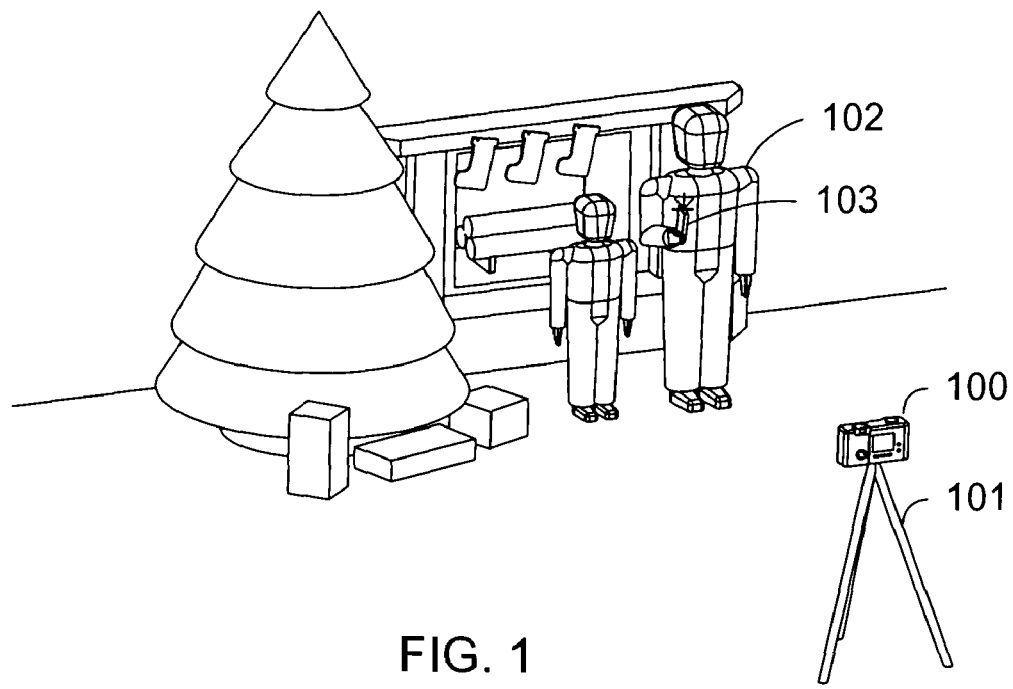
FIG. 1 depicts a system in accordance with an example embodiment of the invention.

FIG. 1 depicts a system in accordance with an example embodiment of the invention, and placed in an example photographic situation where the system can be used to good advantage.

Camera 100 may be placed on a tripod 101 or otherwise held substantially stationary. Camera 100 is directed at a scene to be photographed. Photographer 102 holds a remote control 103, which can signal its location to camera 100.

Figure 2:
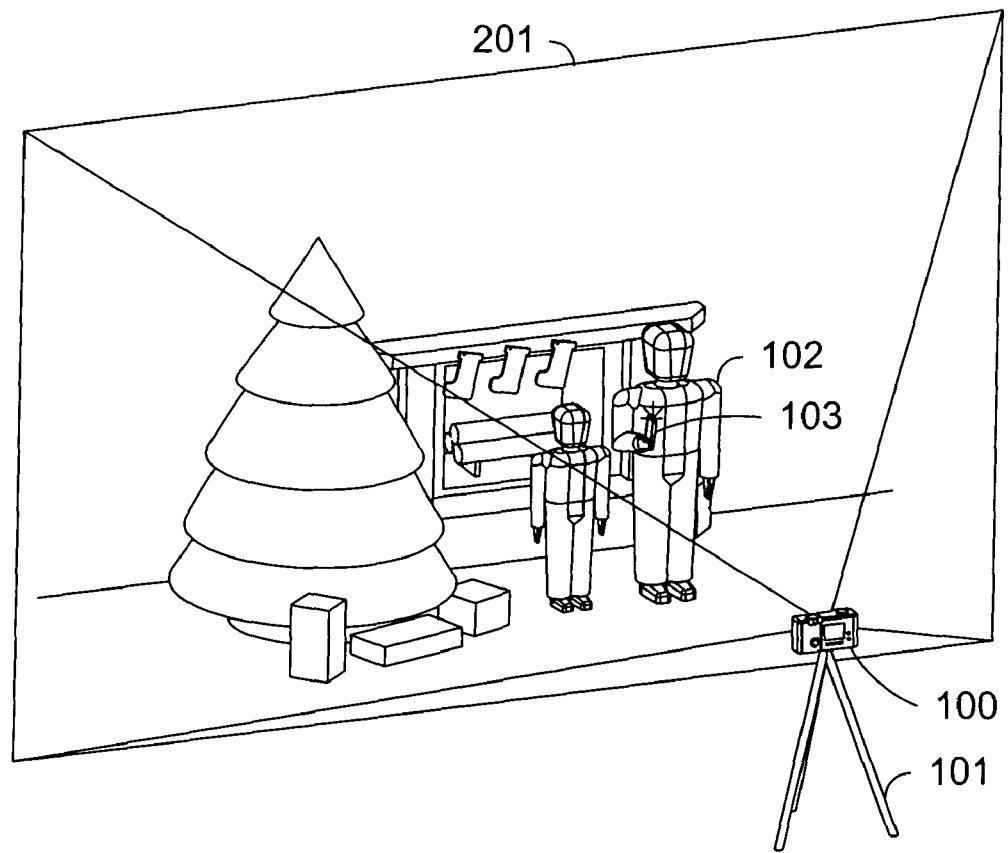
FIG. 2 depicts a camera situated so that its field of view encompasses a relatively large area of interest.

Camera 100 may have a zoom lens or a lens with a fixed focal length. If camera 100 has a zoom lens, it may be configured to a relatively short focal length so as to give the camera a relatively wide field of view. A relatively short focal length is one that is near the shortest focal length the camera is capable of. For example, in a camera with a focal length range of 6 to 18 mm, a focal length near 6 mm would be relatively short. As shown in FIG. 2, camera 100 is situated so that the field of view 201 of the lens encompasses a relatively large area of interest, from which regions may be selected to photograph.

Figure 3:
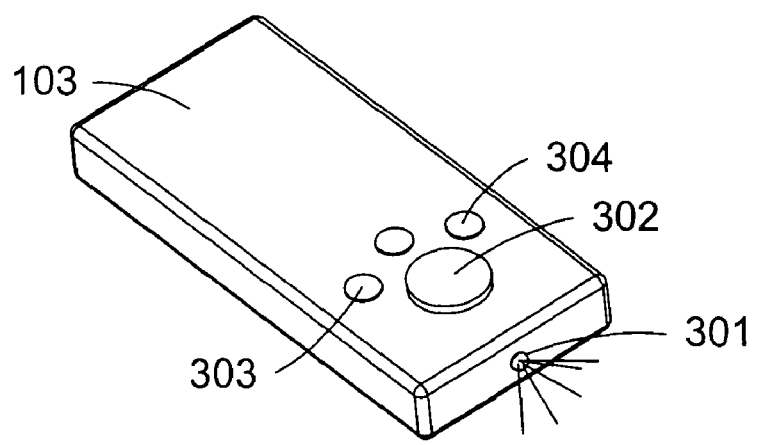
FIG. 3 shows a close up view of a remote control in accordance with an example embodiment of the invention.

FIG. 3 shows a close up view of remote control 103. In one preferred embodiment, remote control 103 comprises a light source 301, to be used in signaling the location of the remote control 103. Light source 301 may be a light emitting diode (LED), an incandescent lamp, or another kind of light source. It may emit light visible to the human eye, or light invisible to the human eye, for example infrared light, as long as the light can be sensed by the camera.

Remote control 103 also comprises various controls operated by the photographer 102. For example, control 302 may cause the camera 100 to take a photograph. Controls 303 and 304 may cause the camera 100 start and stop the making of a video recording. Other controls may be present on remote control 103.

A digital camera such as camera 100 typically uses a lens to project an image of a scene onto an electronic array light sensor. The electronic array light sensor typically comprises many light-sensitive elements sometimes called "pixels". Each pixel measures the brightness of light emanating from a corresponding location in the scene. The electronic array light sensor typically accumulates electrical charge in each pixel in proportion to the brightness of light falling on the pixel. This charge quantity is then measured to determine a numerical value. The numerical value is also often called a "pixel". The meaning of the term "pixel" is generally clear from the context of the reference. The set of numerical values resulting from the measurement of the charges from the pixels of the electronic array light sensor may be collected into a numerical array. The numerical array may be called a digital image, a digital photograph, or sometimes simply an image or a photograph. When properly interpreted and displayed, the digital image reproduces the scene photographed by the camera.

In some cases, fewer than all of the pixels on the electronic array light sensor need be measured to determine numerical values. For example, if a photograph of lower resolution than the camera is capable of is desired, or if a photograph of only a portion of the camera's field of view is desired, some electrical charges may be discarded without being measured or saved.

Figure 4:
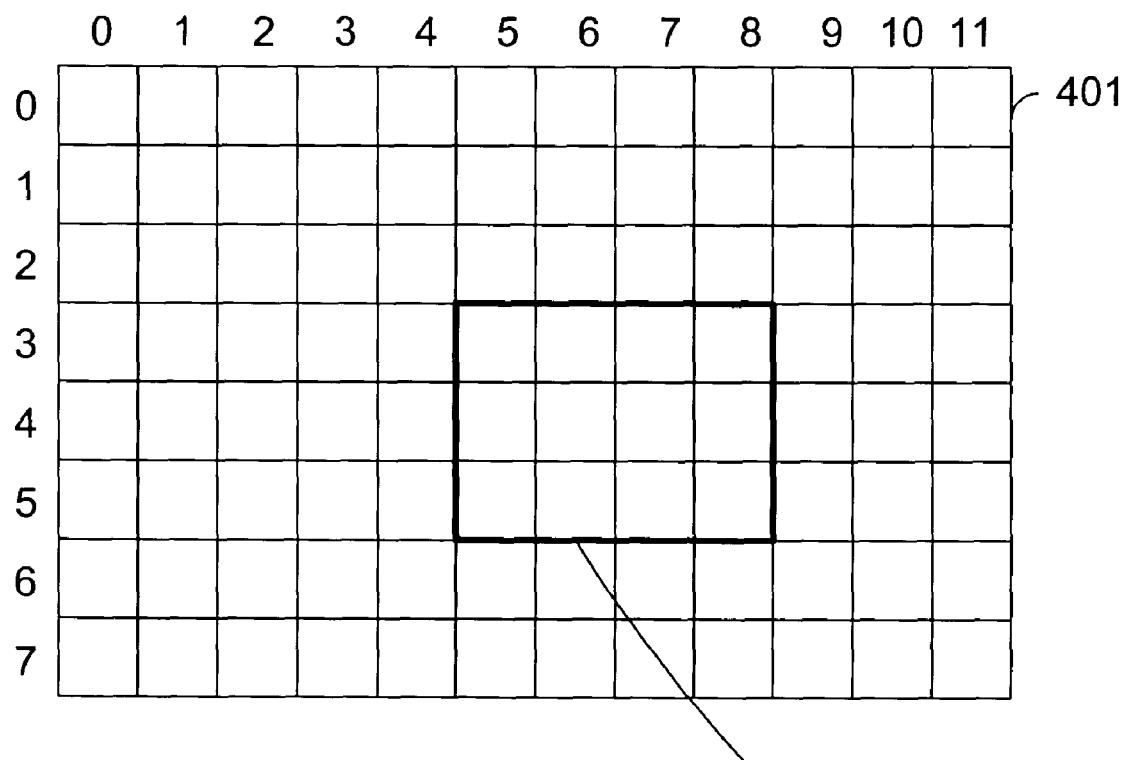
FIG. 4 represents an array of pixels.

FIG. 4 represents an array of pixels 401, and may be thought of as representing the light-sensitive pixels on an electronic array light sensor or as representing corresponding elements in a digital image array. Only a few pixels are shown in FIG. 4 for simplicity of explanation. An actual camera may have many thousands or millions of pixels. Many digital cameras use selective wavelength filtering on some pixels to record color information about a scene, allowing such cameras to produce color photographs. One of skill in the art will recognize that the present invention may be embodied in a camera with color capability or one without.

In FIG. 4, the entire array 401 corresponds to the entire camera field of view 201, and in fact the size of the electronic array light sensor and the characteristics of the lens of camera 100 define the camera's field of view 201. A subarray 402 of pixels may be selected from array 401 in order to select a particular region from the field of view 201 of camera 100. In FIG. 4, subarray 402 has its origin at row 3, column 5 of array 401, and subarray 402 is four pixels wide and three pixels high.

Figure 5:
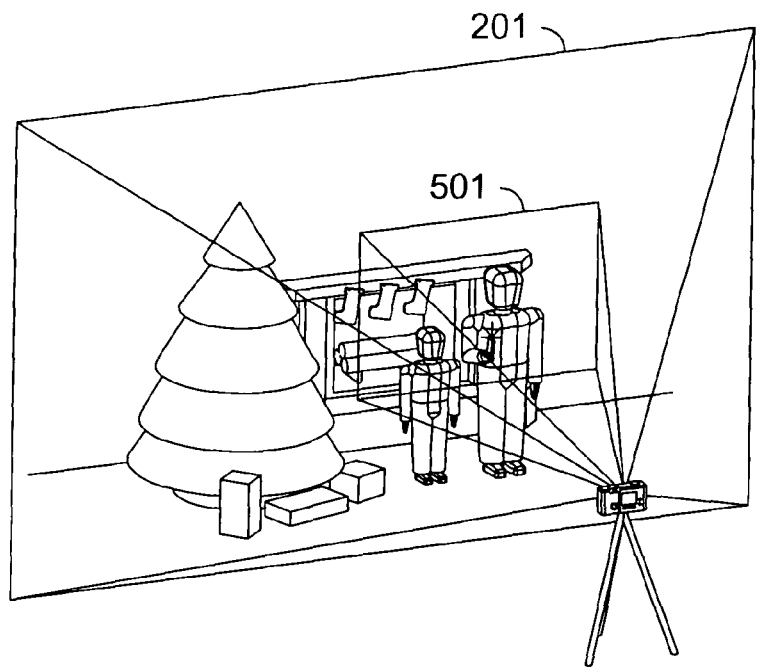
FIG. 5 depicts a particular region being selected from the camera's field of view.
Figure 6:
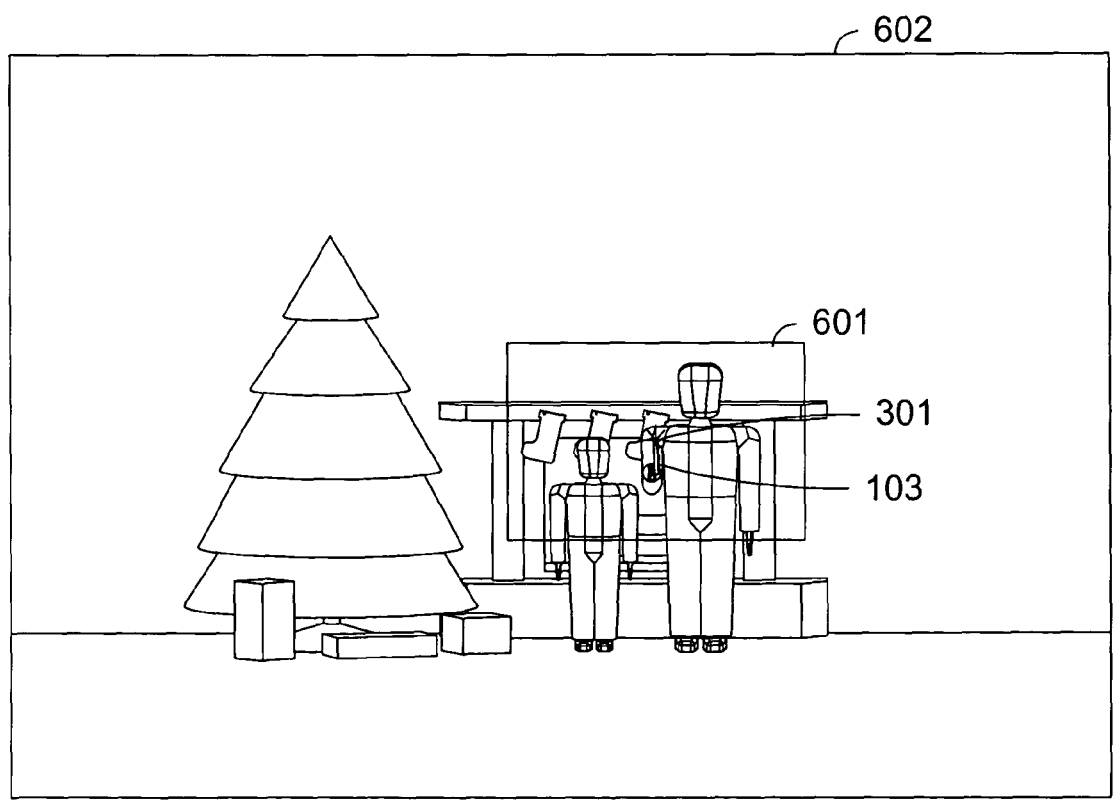
FIG. 6 illustrates how a selected photograph of the part of the scene encompassed by the selected region may compare with a reference photograph.

FIG. 5 depicts a particular region 501, possibly corresponding to subarray 402, being selected from the camera's field of view 201. FIG. 6 illustrates how a selected photograph 601 of the part of the scene encompassed by the selected region 501 may compare with a reference photograph 602 of the scene encompassed by the camera's entire field of view 201.

In FIG. 6, selected photograph 601 is framed such that light source 301 on remote control 103 is placed in the center of selected photograph 601. If camera 100 can detect the location in its field of view 201 of remote control 103, and if a region size has been specified or selected, camera 100 may accomplish such framing by selecting an appropriate subarray from reference photograph 602. This subarray selection may be called "digital framing", as it simulates a photographer's framing of a photograph by selecting a scene region to photograph from a larger choice of possible regions. The digital framing may typically be done by a microprocessor, digital signal processor, or other logic that is part of the camera electronics.

In one example embodiment, the location of remote control 103 in camera field of view 201 may be accomplished as follows. Digital camera 100 may take a sequence of preliminary photographs. The sequence may be taken for the purpose of locating remote control 103, for facilitating camera adjustments such as focusing or selecting a proper exposure, or for a combination of these. The preliminary photographs typically include the entire camera field of view 201, but may be taken at a resolution lower than the camera's full resolution.

In this example embodiment, light source 301 on remote control 103 emits light only intermittently, blinking on and off repeatedly. This blinking or toggling of light source 301 provides a recognizable "beacon" that the camera can distinguish from features in the scene. When light source 301 is on and emitting light at a time when a preliminary photograph is taken, pixels on the camera's electronic array light sensor will receive light from light source 301, and the digital values in the resulting preliminary digital photograph corresponding to the location of light source 301 will indicate the presence of the light. Once light source 301 has switched off and a subsequent preliminary photograph is taken, the corresponding digital values will reflect only the scene illumination. The location of remote control 103 may be detected by comparing consecutive preliminary digital photographs and finding differences resulting from a change in state, the switching on or switching off, of light source 301.

Figure 7:
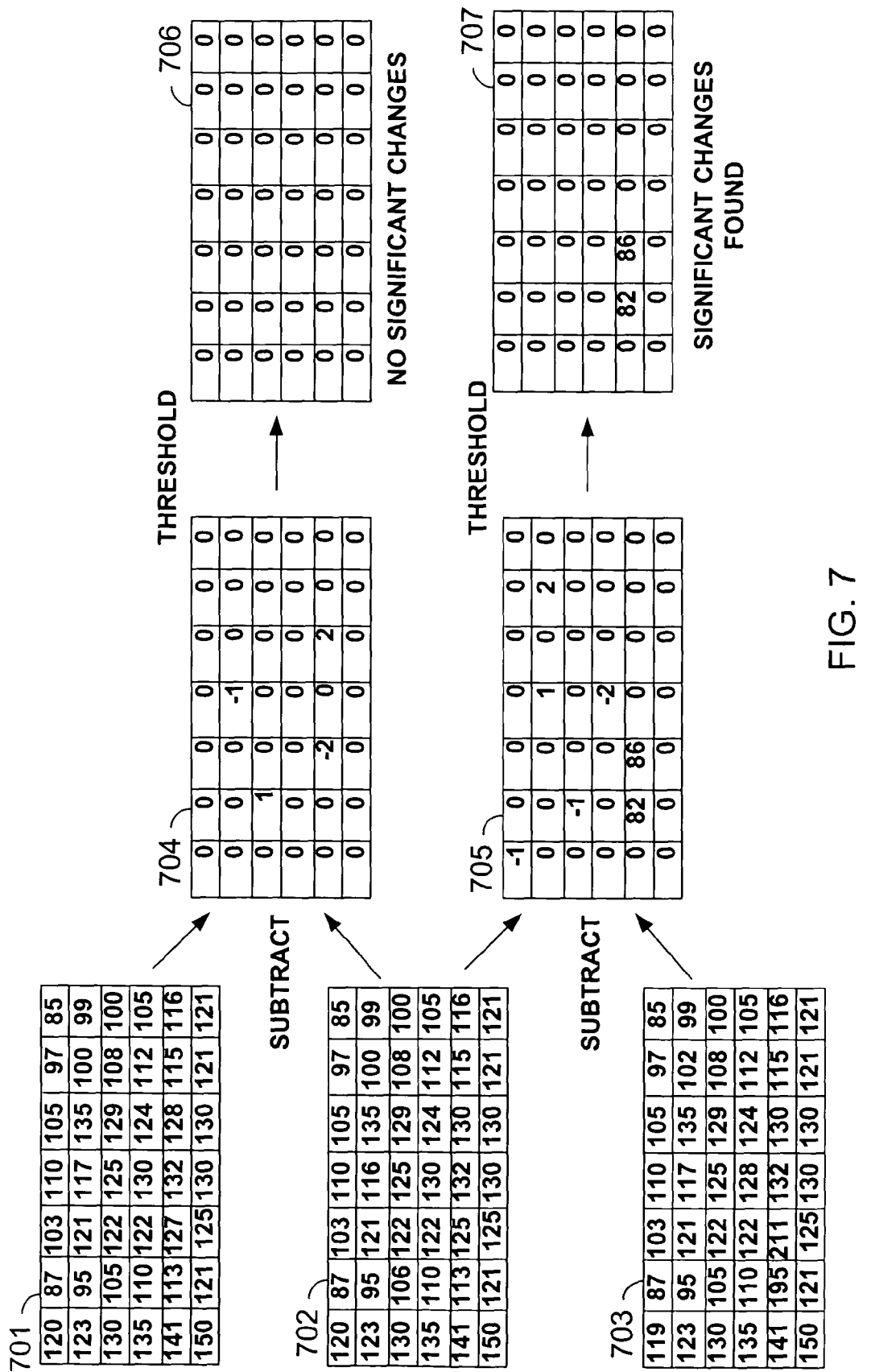
FIG. 7 illustrates consecutive preliminary digital photographs and the detection of the position of an intermittent light in accordance with an example embodiment of the invention.

For example, FIG. 7 illustrates consecutive preliminary digital photographs 701, 702, and 703. For simplicity of illustration, the numeric arrays are reduced in size as compared with a typical digital photograph. Typically, brighter scene locations are indicated in a digital photograph with larger digital values, and darker scene locations are indicated with smaller digital values, although the opposite relationship is possible. Arrays 701 and 702 are substantially identical. Differences in the arrays, representing changes in the digital photographs, are revealed by subtracting, element-by-element, array 702 from array 701. The resulting difference array is shown as array 704. Only a few pixels have changed numeric value between preliminary photographs 701 and 702, and only by small amounts. These changes may be attributable to random noise in the camera electronics, to subject motion, or other effects. In order to screen insignificant changes from consideration, difference array 704 may be subjected to a thresholding operation, wherein all values below a preselected value, for example 5 numeric counts in magnitude, are set to zero. Array 706 illustrates the result of such a thresholding operation. The fact that all elements of array 706 are zeros indicates that no significant changes occurred between preliminary photographs 701 and 702.

A similar process reveals that between preliminary photographs 702 and 703, significant changes did occur at two pixel locations. Two pixels in difference array 705 now have much higher numeric values, and those numeric values survive the thresholding operation as shown by array 707. Because it is unlikely that there are other intermittent sources of light in the scene, remote control 103 can be confidently considered to be at the scene location corresponding to the significantly-changed pixels. The precise location in the camera's field of view may be determined by methods known in the art, such as by locating the largest change in pixel numeric value, or by finding the centroid of the pixels whose values changed significantly between consecutive photographs.

In one example embodiment, the size of selected photograph 601 may be specified in advance of taking any photographs. For example, reference photograph 602 capturing the entire field of view 201 of camera 100 and using all of the pixels on the camera's electronic array light sensor may comprise 2,592 pixels width in the horizontal direction and 1,944 pixels height in the vertical direction, but the camera operator may specify, using controls provided on the camera, that selected photographs such as selected photograph 601 are to be taken with a size of 1024 pixels width and 768 pixels height. These values are provided for illustration only; other sizes may be used within the scope of the appended claims.

Figure 8:
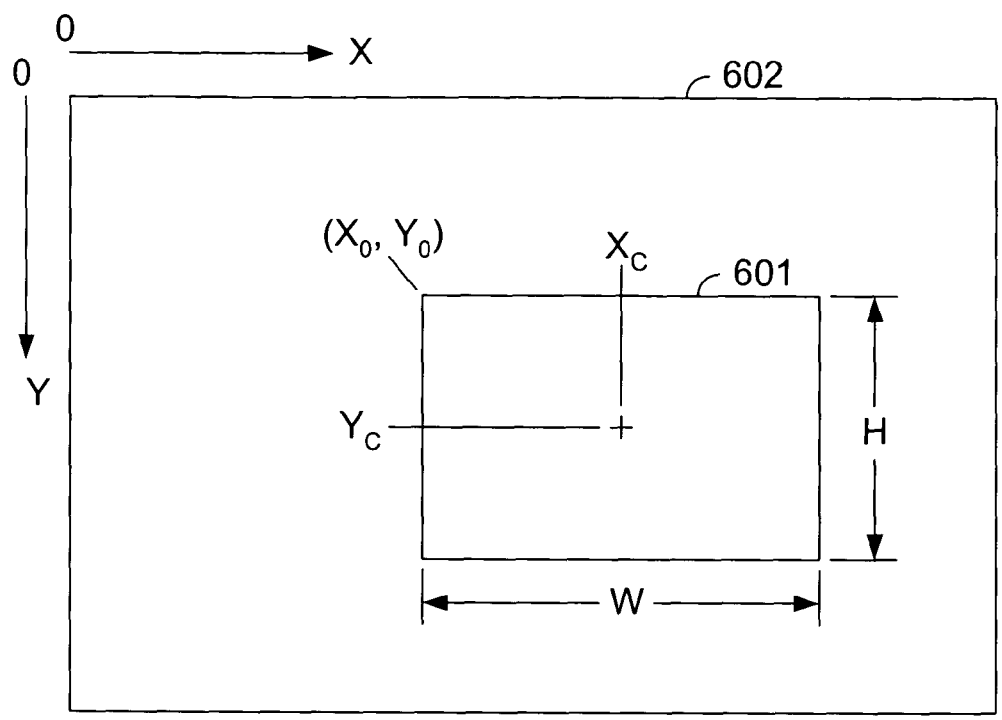
FIG. 8 illustrates how a camera may select a selected photograph from a reference photograph.

FIG. 8 illustrates how camera 100 may select selected photograph 601 from reference photograph 602. In FIG. 8, the camera 100 has located light source 301 of remote control 103 at pixel location $(X_c, Y_c)$. The width and height of selected photograph 601 have been specified to be W and H pixels, respectively. Given these parameters, camera 100 has sufficient information to locate selected photograph 601 in reference photograph 602. Designating the upper left corner of selected photograph 601 as pixel location $(X_0, Y_0)$, $$X_0 = X_c - \frac{W}{2} \qquad 1)$$

and $$Y_0 = Y_c - \frac{H}{2}. \qquad 2)$$

If remote control 103 is located near any edge of reference photograph 602, it may not be possible to position a selected photograph of a specified size in this way, as the boundaries of selected the photograph may extend outside the boundaries of reference photograph 602. In this case, camera 100 may position a selected photograph so that light source 301 of remote control 103 is as nearly centered in the selected photograph as possible.

Figure 9:
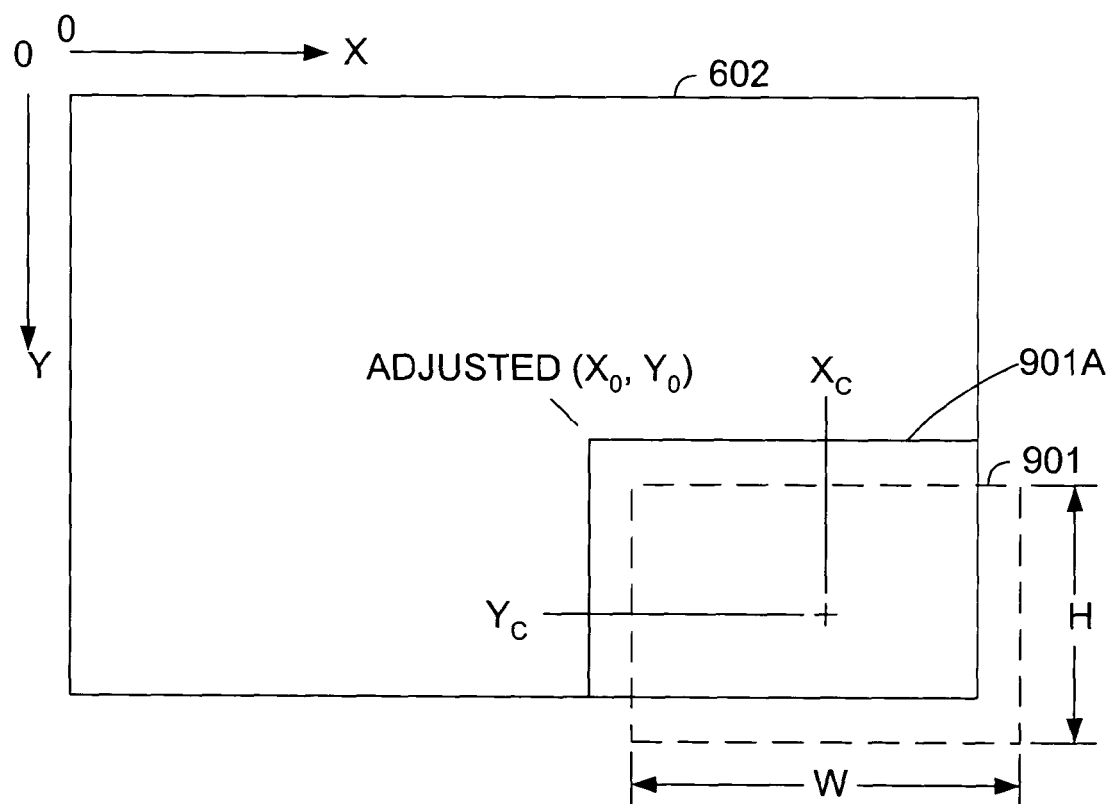
FIG. 9 shows a situation in which a selected photograph cannot be centered about the remote control location.

FIG. 9 shows a situation in which a selected photograph of dimensions W by H pixels cannot be centered about the remote control location $(X_c, Y_c)$. The dashed line shows the boundaries of selected photograph 901 as computed by formulas 1) and 2) above. In this case, the camera may choose selected photograph 901A by adjusting the position of the selected photograph so that it retains its specified size, but is fully contained in reference photograph 602.

As an alternative to adjusting the position of selected photograph 601 within reference photograph 602 when it is not possible to center a photograph of the specified size at the desired location, camera 100 may adjust the size of the photograph to be selected. For example, camera 100 may select the largest photograph that can be centered at the location of light source 301 on remote control 103 while maintaining the aspect ratio of the photograph constant.

Figure 10:
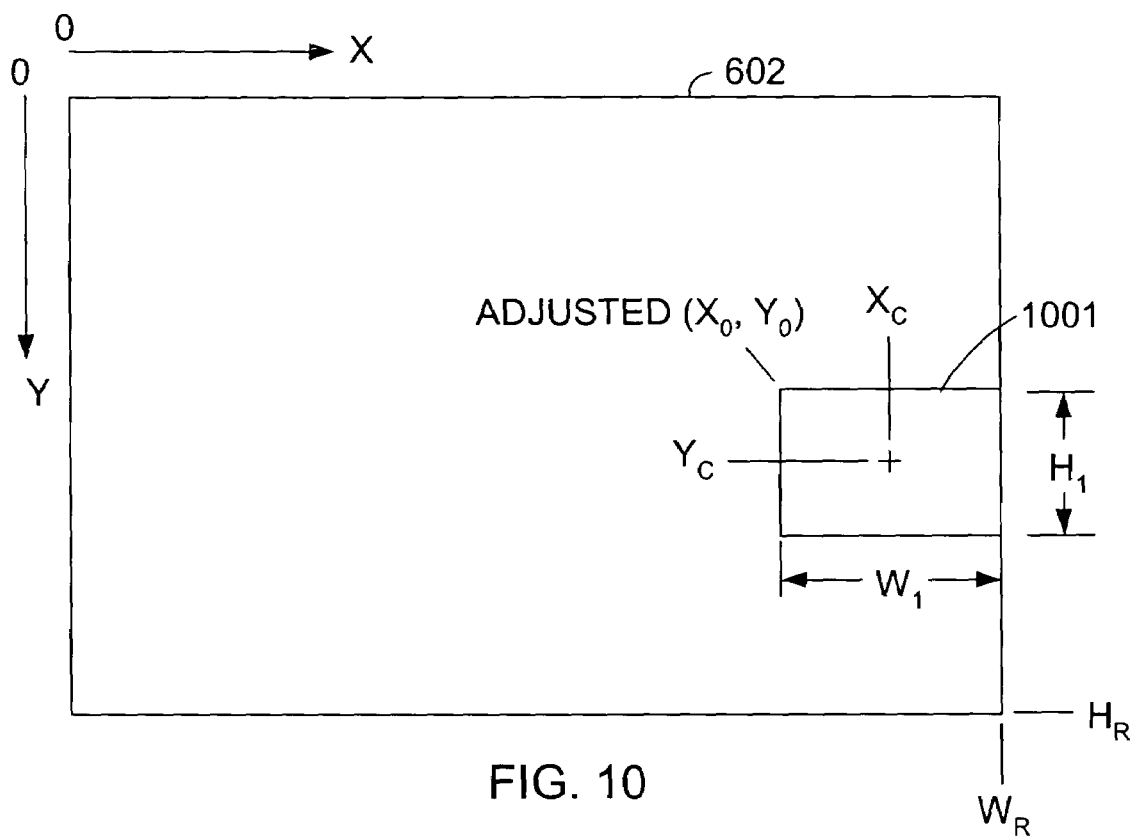
FIG. 10 illustrates choosing the largest selected photograph that is centered on the location of the remote control light source.

FIG. 10 illustrates choosing the largest selected photograph that is centered on the location of the light source 301 on remote control 103. Light source 301 has been located at pixel location $(X_c, Y_c)$. Selected photograph boundary 1001 shows the location of the desired region.

Additionally, maximum and minimum sizes for the selected photograph may optionally be specified. A complete example set of rules for choosing the width $W_1$ and height $H_1$ of selected photograph are given in the algorithm listing below. The desired aspect ratio (the ratio of the photograph's width to its height, typically about 1.5) of the selected photograph is designated A, and the width and height of the reference photograph 602 are designated $W_R$ and $H_R$ respectively. The selected photograph may optionally have a minimum width $W_{min}$ and a maximum width $W_{max}$.

Listing 1.

```
290   REM
300   REM    COMPUTE STARTING WIDTH AND HEIGHT, WITH OPTIONAL
310   REM       SETTING TO PRE-SELECTED MAXIMUM
320   REM
330   W1=MIN (Wmax, 2*Xc)
340   REM
350   REM    COMPUTE CENTERING WIDTH AND HEIGHT WITH EDGE LIMITS
360   REM
370   H1=W1/A
380   IF Xc<W1/2 THEN
390      W1=2*Xc
400      H1=W1/A
410   END IF
420   IF Yc<H1/2 THEN
430      H1=2*Yc
440      W1=H1*A
450   END IF
460   IF (Xc+W1/2) >Wr-1 THEN
470      W1=2*(Wr-Xc-1)
480      H1=W1/A
490   END IF
500   IF (Yc+H1/2) >Hr-1 THEN
510      H1=2*(Hr-Yc-1)
520      W1=H1*A
530   END IF
540   X0=Xc-W1/2
550   Y0=Yc-H1/2
560   REM
570   REM    OPTIONAL SETTING OF SIZE TO PRE-SELECTED MINIMUM AND
580   REM       ADJUSTING POSITION
590   REM
600   IF W1<Wmin THEN
610      W1=Wmin
620      H1=W1/A
630      X0=Xc-W1/2
640      Y0=Yc-H1/2
650      IF (Xc-W1/2) <0 THEN X0=0
660      IF (Xc+W1/2) >Wr-1 THEN X0=Wr-W1-1
670      IF (Yc-H1/2) <0 THEN Y0=0
680      IF (Yc+H1/2) >Hr-1 THEN Y0=Hr-H1-1
690   END IF
```

Once this example algorithm has completed, a selected photograph location and size are determined such that the selected photograph is no larger than the predetermined maximum size, is no smaller than the predetermined minimum size, is completely contained within the reference photograph, is as nearly centered as possible on the location of light source 301 on remote control 103, and has aspect ration A. The values $X_0$ and $Y_0$ indicate the starting location of the selected photograph, and the values $W_1$ and $H_1$ indicate the width and height respectively of the selected photograph. Note that the selected photograph may be constrained to a fixed size by setting $W_{max}$ and $W_{min}$ equal to each other. Setting $W_{min}=0$ and $W_{max}=W_R$ configures the algorithm to find the largest selected photograph that can be centered on the remote control light source 301 within reference photograph 602.

Once the size and location of the selected photograph have been determined, camera 100 can take a final photograph. A final photograph is the photograph that camera 100 has prepared to take. The preparations may involve preliminary photographs used for focusing, exposure determination, framing, or other purposes, as well as selecting a region to photograph. Photographing the selected region may involve taking a digital image of the entire field of view of the camera, and then extracting a subarray corresponding to the selected region from the digital image for storage. This is especially true if the electronic array light sensor in digital camera 100 is a charged coupled device (CCD) sensor or a complementary metal oxide semiconductor (CMOS) sensor. All pixels on the CCD or CMOS sensor, not just those in the selected region, may accumulate charge during the taking of the photograph, even though only those in the selected region will contribute to the final photograph. Digital camera 100 may measure the charges from all of the pixels on the electronic array light sensor and extract the final photograph from the resulting digital image, or may discard some or all of the unnecessary charges without measuring them. Whether accomplished by any of these methods, the effective result is that the selected region is photographed.

In one example embodiment, light source 301 may be interrupted so that it emits no light during the taking of a still photograph, and thus does not appear obtrusively in the final photograph.

Optionally, camera 100 may use the location of remote control light source 301 as the center of a focus region, thus preferentially focusing on subjects in the vicinity of the remote control. Typically, a digital camera performs focusing by maximizing the image spatial contrast in a selected region of the camera's field of view. The focus region may be arbitrarily selected, but is often in the center of the camera's field of view. Selecting a focus region centered on remote control light source 301 ensures that the portion of the scene that is of greatest interest, as indicated by the presence of the remote control, will be in focus. U.S. Pat. No. 6,466,742, having a common assignee with the present application, describes a "focus attracting" remote control, and is hereby incorporated for all that it discloses.

In another example embodiment, camera 100 is capable of making video recordings. A video recording may be any sequence of successive digital images, sometimes called "video frames", captured at substantially regular intervals. The digital images need not be of a size similar to television video nor need they be taken at a frequency similar to television video. In a preferred configuration, light source 301 on remote control 103 flashes at a frequency of about one half the frequency of digital image capture during video recording. This arrangement ensures that most video frames will show a difference in the state of light source 301 as compared with the immediately preceding video frame. For example, if light source 301 flashes at between 0.4 and 0.6 times the frequency of digital image capture, then at least 80 percent of successive video frames will show a change in the state of light source 301 from the previous frame. Camera 100 may adjust the composition of the video recording by re-selecting a region to photograph during recording as light source 301 may move. In this way, camera 100 can simulate pan and tilt motions of a gimbal-mounted camera, but without the complexity of moving the camera.

Unless precise synchronization is provided between the flashing of light source 301 and the capture of video frames, light source 301 may appear in some video frames. In order to reduce the obtrusiveness of having light source 301 in the video sequence, automatic image processing using information from adjacent frames or adjacent pixels may be used remove the effect of the light source.

Figure 11:
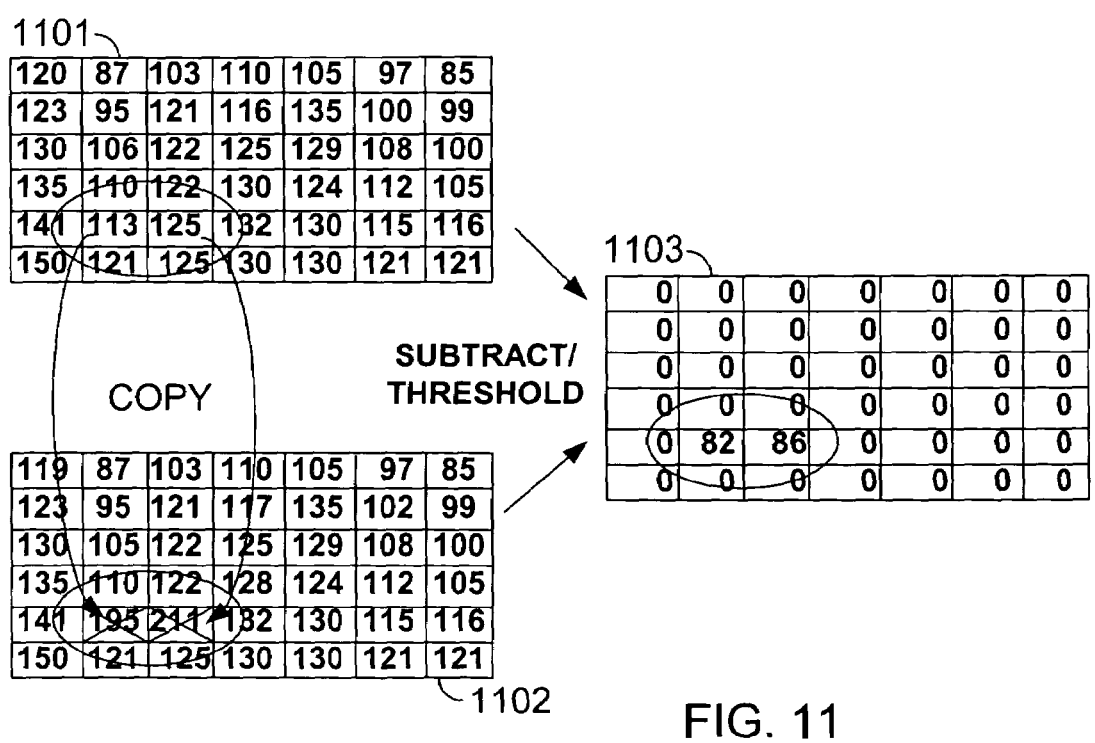
FIG. 11 illustrates an example technique for removing the light source from a video frame.

FIG. 11 illustrates one simple example technique for removing light source 301 from a video frame. Digital images 1101 and 1102 are consecutive frames from a video recording. As described previously, the presence of light source 301 has been detected in two pixels by computing an element-by-element difference frame 1103 between the consecutive frames 1101 and 1102. Once light source 301 has been located, its effect can be removed by copying pixel values from the most recent frame taken when light source 301 was off.

Other techniques may be envisioned for removing the effect of light source 301 from video frames. For example, pixel information from both preceding and following frames could be combined to replace pixel data in a particular frame, for example by interpolation. Alternatively, the effect of light source 301 could be removed from a frame without reference to other frames, by replacing pixel data with information based on surrounding pixels. If the light emitted by light source 301 is substantially monochromatic and camera 100 uses selective wavelength filtering on some pixels to generate color photographs, then light source 301 may be detected by analyzing only those pixels that can sense the light wavelengths emitted by light source 301. For example, if light source 301 is a red light emitting diode (LED), then it is likely that only the red-sensing pixels in the camera need be examined to detect the light source 301, or need be adjusted to remove the effect of light source 301 from a frame.

In another example embodiment, which may be combined with other example embodiments already described, camera 100 includes an optical zoom function, and uses its optical zoom capability to optimize photographic quality in some situations. In some cases, a selected photograph is defined that is completely contained within reference photograph 602 with excess area surrounding the selected photograph. That is, the selected photograph is not at the edge of reference photograph 602. Selected photograph 601 in the Figures is of this kind, while selected photographs 901A and 1001 are not.

In this situation, camera 100 can improve the resolution at which it can photograph the selected region by activating its optical zoom function so that the camera's field of view just encompasses the selected region. That is, the focal length of the lens is increased, causing the camera's field of view to be narrowed, until the selected photographic region is at the edge of the camera's field of view.

Figure 12:
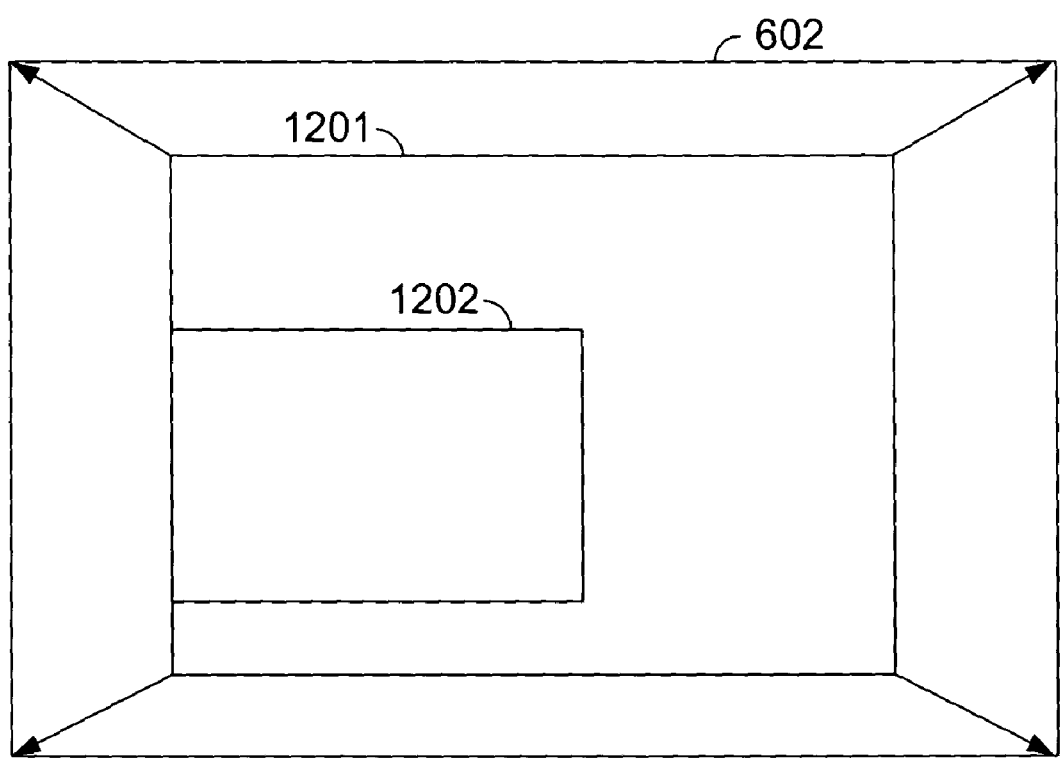
FIG. 12 illustrates using optical zoom to improve the resolution of a selected photograph.

FIG. 12 illustrates using optical zoom to improve the resolution of a selected photograph. Selected photograph 1202 is entirely contained in reference photograph 602, with excess area surrounding it. Camera 100 may actuate its optical zoom such that reference photograph 1201, rather than reference photograph 602, covers the entire electronic array light sensor in camera 100. Selected photograph 1202 can then be extracted from reference photograph 1201, but at higher resolution than if it had been extracted from reference photograph 602.

In yet another example embodiment, light source 301 may be used both for digital framing of photographs, and for controlling other functions of digital camera 100. For example, light source 301 may flash in a uniquely identifiable way (such as remaining on for three consecutive preliminary photographs or video frames, and then shutting off) to signal to the camera to take a final photograph. Signaling the camera to take a final photograph may also be called actuating the camera's shutter release. Using the same light source for digital framing and for controlling other camera functions saves the expense of having two different signaling methods.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A photography system, comprising:
    a remote control; and
    a digital camera having a field of view, which digital camera can detect in its field of view the position of the remote control, and which digital camera selects a region from its field of view to photograph based on the detected position of the remote control;
    wherein the selected region is of a predetermined size, and wherein, when a region of the predetermined size cannot be centered on the detected position of the remote control while keeping within the camera's field of view, the digital camera positions the selected region as nearly as possible to centered on the detected position of the remote control while keeping the selected region within the camera's field of view.

2. A photography system, comprising:
    a remote control; and
    a digital camera having a field of view, which digital camera can detect in its field of view the position of the remote control, and which digital camera selects a region from its field of view to photograph based on the detected position of the remote control wherein the digital camera
    a) selects the largest region that will fit within its field of view when the selected region is centered on the detected position of the remote control, and
    b) centers the selected region on the detected position of the remote control.

3. A photography system, comprising:
    a remote control; and
    a digital camera having a field of view, which digital camera can detect in its field of view the position of the remote control, and which digital camera selects a region from its field of view to photograph based on the detected position of the remote control, wherein minimum and maximum sizes of the selected region are predetermined, and wherein the digital camera
    a) selects a region that is the smaller of the predetermined maximum region size and the largest size that will fit within the camera's field of view and can be centered on the detected position of the remote control when such a region can be selected that is larger than the predetermined minimum region size, and otherwise
    b) selects a region that is of the predetermined minimum region size and positions the region as nearly as possible to centered on the detected position of the remote control while keeping the region within the camera's field of view.

4. The photography system of claim 1, 2, or 3 wherein the remote control further comprises a light source, and the digital camera detects the position of the remote control by detecting the light source.

5. The photography system of claim 4 wherein the light source emits light intermittently.

6. The photography system of claim 5 wherein the digital camera detects the position of the remote control by detecting a change in state of the light source between successive digital images.

7. The photography system of claim 4 wherein the light source emits no light during the taking of a final photograph.

8. The photography system of claim 4 wherein the light source is used to signal the digital camera to perform at least one other function in addition to selecting a region to photograph.

9. The photography system of claim 1, 2, or 3 wherein the digital camera is capable of making video recordings, the remote control comprises a light source that emits light intermittently, and the digital camera removes the effect of the light source from video frames in which the emitting light source appears.

10. The photography system of claim 9 wherein the effect of the light source is removed using pixel information from at least one other video frame in which the emitting light source does not appear.

11. The photography system of claim 1, 2, or 3 wherein the digital camera comprises an optical zoom function, and wherein the digital camera improves a resolution of the selected region using the optical zoom function.

12. A method of photography, comprising:
    detecting, in a field of view of a digital camera, a position of a remote control; and
    automatically selecting, based on the position of the remote control, a region from the camera's field of view to photograph;
    wherein the region is of a predetermined size, and when a region of the predetermined size cannot be centered on the detected position of the remote control while keeping within the camera's field of view, selecting a region from the camera's field of view comprises positioning the selected region as nearly as possible to centered on the detected position of the remote control, while keeping the selected region within the camera's field of view.

13. A method of photography, comprising:
    detecting, in a field of view of a digital camera, a position of a remote control; and
    automatically selecting, based on the position of the remote control, a region from the camera's field of view to photograph;

wherein selecting a region from the camera's field of view comprises
  a) selecting the largest region that can be centered on the detected position of the remote control while fitting within the camera's field of view; and
  b) centering the region on the detected position of the remote control.

14. A method of photography, comprising: detecting, in a field of view of a digital camera, a position of a remote control; and
  automatically selecting, based on the position of the remote control, a region from the camera's field of view to photograph;
  wherein maximum and minimum sizes of the selected region are predetermined, and wherein selecting a region from the camera's field of view comprises
    a) selecting a region to photograph that is the smaller of the predetermined maximum size region and the largest region that can be centered, while remaining within the camera's field of view, on the detected location of the remote control when such a region can be selected that is larger than the predetermined minimum region size, and centering the selected region on the detected location of the remote control; and otherwise
    b) selecting a region to photograph that is of the predetermined minimum region size and is positioned as nearly as possible to centered on the detected location of the remote control and is entirely with the camera's field of view.

15. The method of claim 12, 13, or 14 wherein detecting the position of the remote control further comprises:
  a) emitting light from the remote control; and
  b) detecting the emitted light.

16. The method of claim 15 further comprising:
  a) signaling, using the light emitted from the remote control, the digital camera to perform a function in addition to selecting a region to photograph; and
  b) performing the function in the digital camera.

17. The method of claim 12, 13 or 14 wherein detecting the position of the remote control further comprises:
  a) emitting light intermittently from the remote control; and
  b) detecting changes in the state of the emitted light by comparing successive digital images taken by the digital camera.

18. The method of claim 12, 13, or 14, further comprising:
  a) emitting light intermittently from the remote control;
  b) making a video recording; and
  c) removing the effect of the light from a video frame in which the light appears.

19. The method of claim 18 wherein removing the effect of the light from a video frame in which the light appears further comprises copying pixel information from another video frame.

20. The method of claim 18 wherein the light changes states with a frequency of approximately half the frequency with which the digital camera captures video frames during video recording.

21. The method of claim 12, 13, or 14, further comprising improving a resolution of the selected region using an optical zoom capability of the digital camera.

* * * * *

UNITED STATES PATENT AND TRADEMARK OFFICE
CERTIFICATE OF CORRECTION

| | |
|---|---|
| PATENT NO. | : 7,272,305 B2 |
| APPLICATION NO. | : 10/658073 |
| DATED | : September 18, 2007 |
| INVENTOR(S) | : Donald J. Stavely et al. |

It is certified that error appears in the above-identified patent and that said Letters Patent is hereby corrected as shown below:

In column 10, line 53, in Claim 12, after "and" insert -- , --.

In column 11, line 30, in Claim 14, delete "with" and insert -- within --, therefor.

Signed and Sealed this

Fifth Day of August, 2008

JON W. DUDAS
*Director of the United States Patent and Trademark Office*